United States Patent [19]

Matsui

[11] Patent Number: 4,801,565
[45] Date of Patent: Jan. 31, 1989

[54] SILICON NITRIDE SINTERED BODIES AND A METHOD OF MANUFACTURING THE SAME

[75] Inventor: Minoru Matsui, Nagoya, Japan
[73] Assignee: NGK Insulators, Ltd., Nagoya, Japan
[21] Appl. No.: 35,484
[22] Filed: Apr. 7, 1987
[30] Foreign Application Priority Data Apr. 16, 1986 [JP] Japan .................................. 61-85855

[51] Int. Cl.⁴ ............................................. C04B 35/58
[52] U.S. Cl. ...................................... 501/98; 501/97; 264/65
[58] Field of Search ...................... 501/97, 98; 264/65

[56] References Cited

U.S. PATENT DOCUMENTS

| | | | |
|---|---|---|---|
| 4,388,414 | 6/1983 | Mangels et al. | 501/152 |
| 4,560,669 | 12/1985 | Matsuhiro et al. | 501/98 |
| 4,640,902 | 2/1987 | Lange | 501/98 |

FOREIGN PATENT DOCUMENTS

| | | | |
|---|---|---|---|
| 0009859 | 4/1980 | European Pat. Off. | 501/97 |
| 0124989 | 11/1984 | European Pat. Off. | |
| 0139793 | 5/1985 | European Pat. Off. | |
| 0188468 | 11/1982 | Japan | 501/97 |
| 2118927 | 11/1983 | United Kingdom | |
| 2157282 | 10/1985 | United Kingdom | |

OTHER PUBLICATIONS

838 American Ceramic Soc. Bull., "Silicon Terbium Oxynitride of Composition $Tb_4Si_2O_7N_2$", vol. 58 (1979) Aug. No. 8 M. Montorsi et al., page 789.

838 American Ceramic Society Bulletin, "Fabrication and Properties of Dense Polyphase Silicon Nitride", vol. 62 (1983) Dec., No. 12, Columbus, Ohio, USA, Frederick K. Lange, pp. 1369–1374.

838 Ceramic Bulletin, "Preparation and Characterization of Ultrafine Powders of Refractory Nitrides: II, Sialon", vol. 58, No. 2 (1979.02), M. Hoch et al., pp. 191–193.

838 Journal of American Ceramic Soc., "The Role of Cerium Orthosilicate in the Densification of $Si_3N_4$", vol. 62, No. ½, (1979.01/02), Tai-il Mah et al., pp. 12–16.

Primary Examiner—William R. Dixon, Jr.
Assistant Examiner—Anthony J. Green
Attorney, Agent, or Firm—Parkhurst, Oliff & Berridge

[57] ABSTRACT

A silicon nitride sintered bodies are disclosed, which mainly consist of $Si_3N_4$ and contains at least an oxide of a rare earth element and $ZrO_2$. In the silicon nitride sintered bodies, a J phase solid solution is present in an intergranular phase. The silicon nitride sintered bodies are produced by steps of raw material-formulating, molding and firing. The J phase solution is precipitated in the intergranular phase by temperature-descending step or a reheating step after the firing.

7 Claims, 1 Drawing Sheet

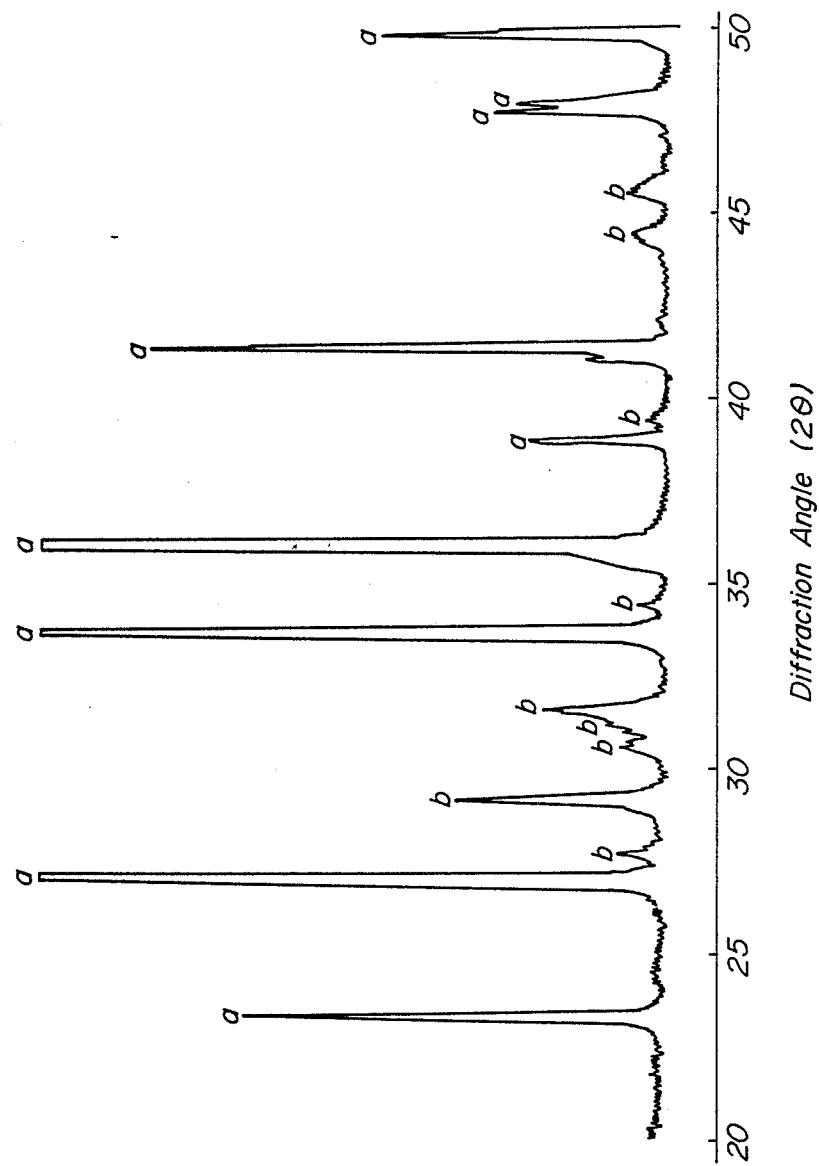

SILICON NITRIDE SINTERED BODIES AND A METHOD OF MANUFACTURING THE SAME

BACKGROUND OF THE INVENTION (1) Field of the Invention

The present invention relates to high density silicon nitride sintered bodies having excellent mechanical strength, acidic resistance and static fatigue resistance, and to a method of manufacturing the same.

(2) Related Art Statement

Since silicin nitride sintered bodies have more excellent mechanical strength, heat resistance, heat shock resistance, and corrosion resistance than metallic materials, they have been examined for use in variety of mechanical parts which operate at such high temperatures where metallic materials usually fail, and uses of the silicon nitride sintered bodies have been actively developed. The materials to be used in the mechanical parts which are to operate at such high temperatures need to have excellent mechanical characteristics at high temperatures as well as high oxidation resistance and static fatigue resistance from the standpoint of the durability and dimensional stability during use of the parts for a long time period.

In order to obtain high density silicon nitride sintered bodies, there have been known a pressureless sintering process, a pressure sintering process, etc. Although various kinds of articles can easily inexpensively be mass-produced by the pressureless sintering process, this process has drawbacks in that an amount of a sintering aid necessary for obtaining high density is greater and the high temperature strength and oxidation resistance are insufficient. On the other hand, although higher density sintered bodies can be obtained with a lesser amount of a sintering aid by the pressure sintering process, it has a major drawback that production costs becomes extremely high in the case of mass production of large size articles having complicated shapes.

In order to solve the present above-mentioned problems, the inventors have proposed in Japanese patent application Laid-open No. 60-54,976 silicon nitride sintered bodies having high density, high strength and excellent oxidation resistance.

However, although the silicon nitride sintered bodies having high mechanical strength and oxidation resistance can be obtained in this method, silicon nitride sintered bodies which sufficiently a satisfy static fatigue characteristic, (SCG characteristic) which is important when in use as mechanical parts working particularly at high temperatures, cannot be obtained.

SUMMARY OF THE INVENTION

It is an object of the present invention to obviate the above-mentioned inconveniences and to provide silicon nitride sintered bodies which have high strength at high temperatures, excellent oxidation resistance and excellent static fatigue resistance and which can be fired in large quantities and in a large article size. A further object of the invention is also to provide a method of manufacturing the same.

The silicon nitride sintered bodies according to the present invention are sintered bodies which mainly consist of $Si_3N_4$ and contain at least an oxide of a rare earth element and $ZrO_2$, and are characterized in that a J phase solid solution is present in an intergranular phase.

According to the method of manufacturing silicon nitride sintered bodies according to the present invention, a formulated powder consisting of a powdery raw material of silicon nitride and at least an oxide of a rare earth element and $ZrO_2$ as a sintering aid is molded, a resulting molding is fired at a temperature from 1,650° to 2,000° C. in a nitrogen or inert gas atmosphere, and then the J phase solid solution is precipitated in the intergranular phase during a temperature-descending step or by a reheating treatment.

In the above-mentioned construction, the present invention is based on a novel acknowledgement that the silicon nitride sintered bodies containing the J phase solid solution in the intergranular phase have improved mechanical strength and oxidation resistance as well as improved static fatigue resistance. Not only the J phase solid solution is present in the intergranular phase but also a crystalline phase of an apatite structure, a crystalline phase of a diopside structure and/or a glass phase may be coexistent therein. It is preferable that substantially only the J phase solid solution is present as the crystalline phase in the intergranular phase. Further, the J phase solid solution can be deposited in the intergranular phase by firing the formulated powder of a particular composition and temperature-descending after the firing or reheating a fired product.

These and other objects, features and advantages of the invention will be appreciated upon reading of the invention when taken in conjunction with the attached drawings, with the understanding that some modifications, variations and changes of the same could be made by the skilled person in the art to which the invention pertains without departing from the spirit of the invention or the scope of the claims appended hereto.

BRIEF DESCRIPTION OF THE DRAWING

For a better understanding of the invention, reference is made to the attached drawing, wherein:

A sole FIGURE is a diagram showing a result of an X-ray diffraction analysis of a silicon nitride sintered body according to the present invention by using a CuK$\alpha$ line.

DETAILED DESCRIPTION OF THE INVENTION

Production of the intergranular crystals such as the J phase solid solution, or the like is influenced by the composition of additives, $SiO_2$ contained in the raw material of $Si_3N_4$, the composition of $SiO_2$, etc. produced in a powder treating process, a fine structure formed under firing conditions, temperature-descending conditions, and reheating conditions in combination. In particular, the formation of the J phase solid solution in the intergranular phase is promoted by the addition of $ZrO_2$.

The J phase solid solution is herein used to mean a crystal phase having a caspidine structure of a monoclinic system represented by $M^I_3(M^{II}_2M^{III}_7)M^IM^{IV}_2$ such as $Ca_3(Si_2O_7)CaF_2$. In the silicon nitride sintered body according to the present invention in which the intergranular phase is crystallized, the crystallographic position of $M^I$ is occupied by Ca, a rare earth element such as Y metal elements such as, Mg, Fe, Ni, or the like the crystallographic position of $M^{II}$ is occupied by Si, Al, or the like and the crystallographic position of $M^{III}$ is occupied by O, N, or the like while the crystallographic position of $M^{IV}$ is occupied by F, O, N, or the like. The elements Mg, Fe, Ni, Al and F can be added as starting materials, as exhibited by the following Examples, or are present as impurities in the silicon nitride, rare earth elements and $ZrO_2$ starting materials.

These crystalline phases can be identified by a powder X-ray diffraction method, and have the same type diffraction curve as that of $Si_3N_4.4Y_2O_3.SiO_2$ shown in JCPDS card No. 32-1451.

In the following, a method of producing the silicon nitride sintered bodies which mainly consist of $Si_3N_4$ and in which the J phase solid solution is present in the intergranular phase is explained by way of example as follows:

First, a formulated powder is obtained by granulating and mixing a specific powdery raw material of silicon nitride, and a sintering aid consisting of $Y_2O_3$, MgO, $ZrO_2$ or an aqueous solution thereof. This granulating and mixing are preferably performed by a wet type or dry type ball mill, an attrition mill, or a vibration mill using $Si_3N_4$ media or nylon-coated iron media.

Next, in the case of the wet type granulation, a molding is obtained by drying a formulated powder and molding a dried powder. In the case of the dry type granulating, a molding is obtained by a dry type press or an injection molding. Alternatively, a molding is obtained by slip casting. The thus obtained molding is pressurelessly sintered or sintered under pressure at a temperature of 1,650° to 2,000° C. in an atmosphere of $N_2$ or an inert gas to obtain a silicon nitride sintered body. Finally, a J phase solid solution is precipitated in an intergranular phase by reheating the thus obtained silicon nitride sintered body at 1,000° to 1,400° C. The J phase solid solution may be precipitated during the temperature-descending step after the firing. In such a case, no reheating treatment is necessary.

In the following, examples of the present invention will be explained, but the invention should never be interpreted to be limited thereto.

EXAMPLE 1

A powdery raw material of silicon nitride having a purity of 97.1% by weight, the average grain diameter of 0.7 μm, and a BET specific surface area of 20 $m^2$/g, and powdery raw materials of an oxide of a rare earth element, an oxide of an element other than the rare earth element, and $ZrO_2$ each having a purity of 99 to 98% by weight, the average grain diameter of 1.4 to 0.6 μm, and a specific surface area of 30 to 10 $m^2$/g were used and formulated at a recipe shown in Table 1. By using silicon nitride media having an outer diameter of 5 to 6 mm and a nylon resin vessel having an inner volume of 1.2 liters, 1.8 kg of the media and 300 ml of tap water were added to 150 g of the formulation raw material, which was granulated by a vibration mill at a vibration rate of 1,200 times/min for 3 hours. Then, water was evaporated to obtain a granulated molding powder having the average grain diameter of 100 μm. Next, the molding powder was isostatically press molded into a shape of 60×60×6 mm at a pressure of 3 tons/$cm^2$. A resulting molding was pressurelessly sintered at a firing temperature of 1,700° C. in a nitrogen atmosphere for 1 hour, and then reheated at 1,200° C. in a nitrogen atmosphere for 2 hours. By so doing, silicon nitride sintered body Nos. 1–10 according to the present invention were obtained. Apart from the above, silicon nitride sintered bodies falling outside the composition scope of the present invention were prepared under the same conditions, thereby obtaining sintered body Nos. 11–19 as Comparative Examples. With respect to the thus obtained sintered bodies, the intergranular crystalline phase, relative density, four point bending strengths at room temperature, 800° C., and 1,200° C., maximum stress (as a static fatigue characteristic) at which a test piece was not fractured when maintained at 800° C. for 1,000 hours under a given load are shown in Table 1. In Table 1, the intergranular crystalline phase of the sintered body was identified from an X-ray diffraction analysis using a CuKα line, and the density was determined by an Archimedes method. The four point bending strength was measured by a "Fine ceramics bending strength testing method" in JIS R1601. Further, with respect to the measurement of the fatigue characteristics, the stress at which a test piece having the same dimension as in the measurement of the four point bending strength measurement was not fractured when maintained at 800° C. for 1,000 hours under the above load was examined by the same method. J, A and D in Table 1 are the J phase solid solution, an apatite phase, and a diopside phase, respectively. The apatite phase is a crystalline phase of an apatite structure having the same type diffraction curve as $Si_3N_4.10Y_2O_3.9SiO_2$ expressed by JCPDS card No. 30-1462 in the powder X-ray diffraction analysis. The diopside phase is a crystalline phase of a diopside structure having the same type diffraction curve as $CaO.MgO.2SiO_2$ shown in JCPDS card No. 11-654 in the powder X-ray diffraction analysis.

TABLE 1

| | No. | Formulated composition (wt %) | | | Crystalline phase at grain boundaries | Relative density (%) | Four point bending strength (MPa) | | | Static fatigue characteristics Maximum stress under which test piece did not fracture when exposed at 800° C. for 1000 hrs (MPa) |
| | | $Si_3N_4$ | Oxide of rare earth element | Oxide other than rare earth element oxide | $ZrO_2$ | | | Room temperature | 800° C. | 1200° C. | |
|---|---|---|---|---|---|---|---|---|---|---|---|
| Present Invention | 1 | 93.5 | $Y_2O_3$ 6 | — | 0.5 | J | 96 | 820 | 820 | 840 | 775 |
| | 2 | 89 | $Y_2O_3$ 10 | — | 1 | J | 96 | 860 | 830 | 850 | 800 |
| | 3 | 93.5 | $CeO_2$ 6 | — | 0.5 | J | 96 | 750 | 750 | 560 | 700 |
| | 4 | 89 | $CeO_2$ 10 | — | 1 | J | 95 | 790 | 770 | 530 | 725 |
| | 5 | 93.5 | $Nd_2O_3$ 6 | — | 0.5 | J | 97 | 780 | 790 | 770 | 750 |
| | 6 | 89 | $Nd_2O_3$ 10 | — | 1 | J | 96 | 800 | 790 | 760 | 750 |
| | 7 | 93.5 | $Er_2O_3$ 6 | — | 0.5 | J | 96 | 790 | 800 | 780 | 750 |
| | 8 | 89 | $Er_2O_3$ 10 | — | 1 | J + A | 95 | 810 | 790 | 770 | 725 |
| | 9 | 93.5 | $Yb_2O_3$ 6 | — | 0.5 | J + D | 97 | 800 | 800 | 730 | 750 |
| | 10 | 89 | $Yb_2O_3$ 10 | — | 1 | J | 97 | 800 | 790 | 780 | 750 |
| Comparative Example | 11 | 90 | $Y_2O_3$ 10 | — | — | A | 95 | 830 | 830 | 800 | 450 |
| | 12 | 90 | $CeO_2$ 10 | — | — | A | 94 | 800 | 810 | 780 | 400 |
| | 13 | 90 | $Nd_2O_3$ 10 | — | — | A | 95 | 780 | 780 | 790 | 400 |

TABLE 1-continued

| | | Formulated composition (wt %) | | | | | Four point bending strength (MPa) | | | Static fatigue characteristics Maximum stress under which test piece did not fracture when exposed at 800° C. for 1000 hrs (MPa) |
|---|---|---|---|---|---|---|---|---|---|---|
| No. | $Si_3N_4$ | Oxide of rare earth element | Oxide other than rare earth element oxide | $ZrO_2$ | Crystalline phase at grain boundaries | Relative density (%) | Room temperature | 800° C. | 1200° C. | |
| 14 | 90 | $Er_2O_3$ 10 | — | — | A | 96 | 820 | 810 | 800 | 350 |
| 15 | 90 | $Yb_2O_3$ 10 | — | — | A | 95 | 830 | 800 | 800 | 375 |
| 16 | 89 | — | MgO 10 | 1 | — | 95 | 750 | 750 | 700 | 300 |
| 17 | 90 | — | MgO 10 | — | — | 94 | 730 | 700 | 600 | 275 |
| 18 | 89 | — | $Al_2O_3$ 10 | 1 | — | 90 | 680 | 670 | 530 | 250 |
| 19 | 90 | — | $Al_2O_3$ 10 | — | — | 89 | 650 | 660 | 510 | 275 |

A diffraction curve of a silicon nitride sintered body No. 1 according to the present invention in an X-ray diffraction analysis using CuKα line is shown in FIG. 1. In the diffraction curve, diffraction peaks denoted by "a" are those of β-$Si_3N_4$, and diffraction peaks denoted by "b" coincide with plane spaces of the J phase solid solution $Si_3N_4.4Y_2O_3.SiO_2$ shown in JCPDS card No. 32-1451.

As obvious from Table 1 and FIG. 1, the sintered bodies containing $Si_3N_4$, an oxide of a rare earth element and $ZrO_2$ within the ranges of the present invention precipitate the J phase solid solution in the intergranular phase so that their strength at room temperature and 1,200° C. is not only high but also their static fatigue characteristic is excellent while they are substantially free from the reduction in strength after lapse of time of 1,000 hours at 800° C. Thus, it was found that the silicon nitride sintered bodies according to the present invention are far more excellent as compared with Comparative Examples. Further, it was found that the silicon nitride sintered body Nos. 1 and 2 according to the present invention containing $Y_2O_3$ as a rare earth element oxide was excellent particularly in the four point bending strength at 1,200° C.

EXAMPLE 2

A powdery raw material of silicon nitride having a purity of 97.1% by weight, the average grain diameter of 0.7 μm, and a BET specific surface area of 20 m²/g and powdery raw materials of $Y_2O_3$, MgO, and $ZrO_2$ each having a purity of 99 to 98% by weight, the average grain diameter if 1.4 to 0.6 μm and the BET specific surface area of 30 to 10 m²/g were used and formulated at a recipe shown in Table 2, and moldings were prepared by the same method as in Example 1. The moldings were pressurelessly sintered at a firing temperature shown in Table 2 in a nitrogen atmosphere for one hour, and then reheated at 1,200° C. in a nitrogen atmosphere for 2 hours, thereby obtaining silicon nitride sintered body Nos. 20 to 28 according to the present invention. Apart from the above, silicon nitride sintered bodies falling outside the composition ranges of the present invention were prepared by the same conditions, thereby obtaining sintered body Nos. 29 to 31 as Comparative Examples. With respect to the thus obtained sintered bodies, the intergranular crystalline phase, the relative density, four point bending strengths at room temperature, 800° C. and 1,200° C., a stress (as a static fatigue characteristic) at which a test piece was not fracture when maintained at 800° C. for 1,000 hours under a given load are shown in Table 2. The intergranular crystalline phase, the relative density, the four point bending strength, and the static fatigue characteristic of the sintered bodies were measured by the same methods as in Example 1. In Table 2, J, A and D means the same meanings as in Table 1. K is a crystalline phase of wollastonite structure having the same type diffraction curve as that of $YSiO_2N$ shown in JCPDS card 31-1462 in the powder X-ray diffraction analysis.

TABLE 2

| | No. | Formulated composition (wt %) | | | | Firing temperature (°C. × 1 hr) | Crystalline phase at grain bondaries | Relative density (%) | Four point bending strength (MPa) | | | Static fatigue characteristics Maximum stress under which test piece did not fracture when exposed at 800° C. for 1000 hrs (MPa) |
|---|---|---|---|---|---|---|---|---|---|---|---|---|
| | | $Si_3N_4$ | $Y_2O_3$ | MgO | $ZrO_2$ | | | | Room temperature | 800° C. | 1200° C. | |
| Present invention | 20 | 93.5 | 4 | 2 | 0.5 | 1700 | J | 96 | 800 | 790 | 580 | 750 |
| | 21 | 90.7 | 5 | 4 | 0.3 | 1700 | J | 97 | 900 | 890 | 870 | 850 |
| | 22 | 89 | 5 | 5 | 1 | 1700 | J | 97 | 940 | 940 | 950 | 875 |
| | 23 | 89.5 | 6 | 4 | 0.5 | 1680 | J | 98 | 980 | 970 | 970 | 925 |
| | 24 | 89.7 | 4 | 6 | 0.3 | 1680 | J | 96 | 920 | 900 | 920 | 850 |
| | 25 | 91 | 3 | 5 | 1 | 1680 | J + A | 96 | 890 | 890 | 870 | 850 |
| | 26 | 91.5 | 7 | 2 | 0.5 | 1660 | J + D | 97 | 900 | 900 | 800 | 825 |
| | 27 | 88.7 | 8 | 3 | 0.3 | 1660 | J | 96 | 930 | 920 | 930 | 875 |
| | 28 | 93 | 3 | 3 | 1 | 1660 | J | 95 | 810 | 790 | 560 | 750 |
| Comparative Example | 29 | 90.7 | 5 | 4 | 0.3 | 1750 | A, K | 96 | 920 | 930 | 780 | 400 |
| | 30 | 89.5 | 6 | 4 | 0.5 | 1730 | A, K | 97 | 950 | 940 | 810 | 375 |
| | 31 | 89 | 4 | 6 | 1 | 1780 | A, K | 96 | 890 | 910 | 790 | 325 |

As obvious from Table 2, since the J phase solid solution is not precipitated in the intergranular phase in the case of Comparative Example Nos. 29 to 31 which do not contain $ZrO_2$, their strength at 1,200° C. and static fatigue characteristic are deteriorated. As compared with this, the silicon nitride sintered bodies containing $Si_3N_4$, $Y_2O_3$ and $ZrO_2$ according to the present invention precipitates the J phase solid solution in the intergranular phase so that the relative density is not less than 95%, and the four point bending strength at room temperature is not less than 800 MPa at room temperature, and not less than 500 MPa at 1,200° C. and also the static fatigue characteristic is also excellent, while they are substantially free from the reduction in strength after the lapse of time of 1,000 hours at 800° C. Thus, they are extremely excellent.

As having been mentioned in the above, in the silicon nitride sintered body and the manufacturing method thereof according to the present invention, $Si_3N_4$, $Y_2O_3$, and $ZrO_2$ are contained and the J phase solid solution is precipitated in the intergranular phase, so that the silicon nitride sintered bodies having extremely excellent density, mechanical strength, oxidation resistance and fatigue characteristic can be obtained. Since the silicon nitride sintered bodies according to the present invention can be industrially obtained at an inexpensive cost, they can be used in a variety of an applications such as mechanical structural materials for engine parts, gas turbine parts, etc., and they have extremely great industrial values.

What is claimed is:

1. A silicon nitride sintered body consisting essentially of $Si_3N_4$ as a main ingredient, at least one oxide of a rare earth element present in an amount between 3–10% by weight and $ZrO_2$ present in an amount less than 1.0% by weight, wherein said sintered body has an intergranular phase which consists mainly of a J-phase solid solution, said J-phase solid solution being a crystal phase having a caspidiene structure of a monoclinic system represented by the formula: $M_3^I(M_2^{II}M_7^{III})M^IM_2^{IV}$, wherein $M^I$ is an element selected from the group consisting of Y, Mg, Fe and Ni; $M^{II}$ is an element selected from the group consisting of Si and Al; $M^{III}$ is an element selected from the group consisting of O and N; and $M^{IV}$ is an element selected from the group consisting of F, O and N.

2. A silicon nitride sintered body according to claim 1, wherein the oxide of the rare earth element is $Y_2O_3$.

3. A silicon nitride sintered body according to claim 2, which further contains MgO.

4. A silicon nitride sintered body according to claim 3, wherein the relative density and a four point bending strength at 1,200° C. in air of the sintered body are not less than 95% and 500 MPa, respectively, and the silicon nitride sintered body is substantially free from reduction in strength after exposure to an 800° C. air atmosphere.

5. A method of manufacturing a silicon nitride sintered body, comprising:
preparing a powder consisting essentially of powdery raw materials of silicon nitride, at least one oxide of a rare earth element present in an amount between 3–10% by weight and $ZrO_2$ present in an amount less than 1.0% by weight as a sintering aid;
molding the thus prepared powder;
firing the resulting molding at a temperature between 1,650° and 2,000° C. in a nitrogen or inert gas; and
precipitating an intergranular phase consisting mainly of a J-phase solid solution by controlling a temperature-descending step or reheating the sintered body, said J-phase solid solution being a crystal phase having a caspidiene structure of a monoclinic system represented by the following formula: $M_3^I(M_2^{II}M_7^{III})M^IM_2^{IV}$, wherein $M^I$ is an element selected from the group consisting of Y, Mg, Fe and Ni; $M^{II}$ is an element selected from the group consisting of Si and Al; $M^{III}$ is an element selected from the group consisting of O and N; and $M^{IV}$ is an element selected from the group consisting of F, O and N.

6. A method according to claim 5, wherein the oxide of the rare earth element is $Y_2O_3$.

7. A method according to claim 6, wherein the formulated powder contains MgO.

* * * * *